(12) United States Patent
Chabanne et al.

(10) Patent No.: US 11,005,647 B2
(45) Date of Patent: May 11, 2021

(54) METHOD FOR PROCESSING AN IMAGE EXECUTED BY A TERMINAL FORMING A "WHITE BOX" ENVIRONMENT

(71) Applicant: IDEMIA IDENTITY & SECURITY FRANCE, Courbevoie (FR)

(72) Inventors: Herve Chabanne, Courbevoie (FR); Julien Bringer, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 219 days.

(21) Appl. No.: 16/190,768

(22) Filed: Nov. 14, 2018

(65) Prior Publication Data

US 2019/0149319 A1 May 16, 2019

(30) Foreign Application Priority Data

Nov. 14, 2017 (FR) ...................................... 1760676

(51) Int. Cl.
*H04L 9/06* (2006.01)
*H04W 12/06* (2021.01)
(Continued)

(52) U.S. Cl.
CPC ............ *H04L 9/0643* (2013.01); *G06F 21/30* (2013.01); *H04L 9/002* (2013.01); *H04L 9/32* (2013.01);
(Continued)

(58) Field of Classification Search
CPC ......... H04L 9/0643; H04L 9/002; H04L 9/32; H04L 63/08; H04L 9/3231;
(Continued)

(56) References Cited

U.S. PATENT DOCUMENTS

| 6,487,659 | B1* | 11/2002 | Kigo | ..................... H04L 9/3013 |
| | | | | 713/168 |
| 8,312,521 | B2* | 11/2012 | Isobe | ..................... G06F 21/51 |
| | | | | 726/7 |

(Continued)

FOREIGN PATENT DOCUMENTS

WO 2015/097413 A1 7/2015

OTHER PUBLICATIONS

Preliminary Research Report and Written Opinion received for French Application No. 1760676, dated May 9, 2018, 8 pages (1 page of French Translation Cover Sheet and 7 pages of original document).

(Continued)

*Primary Examiner* — Jayesh M Jhaveri
(74) *Attorney, Agent, or Firm* — Womble Bond Dickinson (US) LLP

(57) ABSTRACT

The present invention relates to a method for processing an image executed by a terminal (1), comprising steps of receiving a proof datum previously input by a user of the terminal (1), setting (104, 106) of at least one parameter to a first value when the proof datum is equal to a secret reference datum, and to a second value different to the first value when the proof datum is different to the secret reference datum, and generation (200) of an output datum from an input datum being or dependent on an image previously acquired by a sensor (4), and also from the parameter, the output datum having a value as function of the value the parameter has been set to.

10 Claims, 2 Drawing Sheets

(51) Int. Cl.
*H04L 29/06* (2006.01)
*G06F 21/30* (2013.01)
*H04L 9/32* (2006.01)
*H04L 9/00* (2006.01)
*H04L 9/08* (2006.01)
*G06F 21/32* (2013.01)

(52) U.S. Cl.
CPC ............. *H04L 63/08* (2013.01); *H04W 12/06* (2013.01); *H04L 9/3231* (2013.01); *H04L 2209/16* (2013.01)

(58) Field of Classification Search
CPC ....... H04L 2209/16; H04L 9/06; H04L 29/06; H04L 9/00; H04L 9/08; G06F 21/30; G06F 21/32; H04W 12/06
See application file for complete search history.

(56) References Cited

U.S. PATENT DOCUMENTS

| | | | |
|---|---|---|---|
| 2003/0007670 A1 | 1/2003 | Hamid | |
| 2004/0164848 A1* | 8/2004 | Hwang | H04L 63/0861 340/5.82 |
| 2005/0138392 A1* | 6/2005 | Johnson | G06F 21/6218 713/186 |
| 2006/0239503 A1 | 10/2006 | Petrovic et al. | |
| 2007/0226512 A1* | 9/2007 | Kevenaar | G06F 21/6245 713/186 |
| 2009/0083544 A1* | 3/2009 | Scholnick | G06F 21/14 713/186 |
| 2015/0113616 A1* | 4/2015 | Sampas | G06F 21/32 726/6 |
| 2018/0150647 A1* | 5/2018 | Naqvi | G06F 21/602 |
| 2020/0159914 A1* | 5/2020 | Kamal | H04L 9/0662 |

OTHER PUBLICATIONS

European Search Report and Written Opinion received for EP Patent Application No. 18306489.8, dated Jan. 3, 2019, 7 pages of Original Document Only.

* cited by examiner

METHOD FOR PROCESSING AN IMAGE EXECUTED BY A TERMINAL FORMING A "WHITE BOX" ENVIRONMENT

FIELD OF THE INVENTION

The present invention relates to a method for processing an image in a user terminal.

The invention is advantageously applied to processing images acquired by biometric sensors, for example for biometric authentication.

PRIOR ART

Some processes executed in terminals must be secured by means of protective measures.

The aim of some protective measures is to preserve the confidentiality of some secret data stored in a terminal, for example a password for example granting access to a service provided by the process. The aim of an attacker in this case will be to try guessing the value of the secret data so as to be able to be granted an access to the service. The added value of processes provided with such protective measures is therefore in its capacity to resist such attacks.

The aim of other protective measures is to preserve the confidentiality of program code functions implemented in a terminal. The added value of such processes can in fact be the use of optimal values of parameters during these processes, these optimal values being the fruit of a long selection process, and therefore representing know-how to be protected.

Such a challenge occurs in particular in program codes producing an output datum from an image previously acquired by a sensor. In such codes, the quality of the output datum depends directly on the values of parameters used by functions of the executed code.

For example, the output datum can be a biometric datum acquired by a biometric sensor, this output datum intended to be compared to another datum in terms of biometric authentication. In such an application, the quality of the biometric datum is illustrated especially by its capacity to characterize a single user, so as to generate the fewest possible detections missed on completion of such biometric authentication.

When an attacker cannot obtain direct access to the memory of a terminal the secrets of which he wants to penetrate, the attacker can perform side channel attacks, consisting of observing the external performance of the terminal in various contexts. Document WO2015097413A1 for example describes a method wherein operations are carried out in parallel with processing so as to scramble the signals observed during a side channel attack.

But there are low-security terminals which constitute what is called a "white box". An attacker can obtain access not only to input and output data of a program run by a white box, but also has access to the intermediate data of this program. The scrambling proposed for example in document WO2015097413A1 becomes fully ineffective in white boxes.

By making correlations between these data and reverse engineering, an attacker can deduce from this the general function fulfilled by the terminal and then deduce the optimal values of parameters which lead to an output datum of good quality.

SUMMARY OF THE INVENTION

An aim of the invention is to prevent an attacker from obtaining output data from processing an image which is good quality when the image-processing is executed by a terminal constituting a white box.

Another aim of the invention is to prevent an attacker from using reverse engineering to deduce optimal values of parameters used by this image-processing to produce output d of good quality.

According to a first aspect of the invention, a method for processing an image is therefore proposed which is executed at a terminal, comprising steps of receiving proof data previously input by a user of the terminal, setting of at least one parameter to a first value when the proof data is equal to secret reference data, and to a second value different to the first value when the proof data is different to the secret reference data, and generation of output data from input data being or dependent on an image previously acquired by a sensor, and also from the parameter, the output data having a value as function of the value the parameter has been set to.

In the method according to the first aspect of the invention, an output data is generated both in the event where the proof data is different to the secret reference data and in the event where these data are identical. In this way, an attacker having access to the memory cannot easily determine if the proof data he has input is correct or not by observing whether the image-processing has been fully executed or not (that is, has produced an output data or not). The method according to the first aspect of the invention therefore offers a higher level of security in "white box" environments than methods producing no output data when a proof data input is incorrect.

Also, according to the proposed method, the proof data input leverages the value of the output data. As a consequence, when an attacker does not know the secret reference data, by inputting different values of proof data he will obtain output data of diverse quality. He could especially obtain a degraded or even very degraded output data.

The setting comprises the application of a pseudo-random function to the proof data so as to produce an intermediate data, wherein the parameter depends on the intermediate data. The use of such a pseudo-random function for setting the value of the parameter is advantageous is relatively unpredictable.

In the above application in which the output data is a biometric data acquired by a biometric sensor, it is difficult in particular for an attacker to evaluate the quality of the output data he obtains. It is therefore very difficult, in this particular application, for an attacker to determine a value of the parameter leading to an output data of optimal value.

Preferably, the values of the parameter are adapted so that the output data is degraded when the parameter is set to the second value relative to when the parameter is set to the first value. In this case, since the attacker does not know the secret reference data he can utilize the image-processing in degraded mode only. In the above biometric application, the degraded output data will be likelier to generate a negative authentication result as it could be considered as too different to the data with which will be compared in this authentication.

Preferably, the second value of the parameter can be specific to the proof data received. This makes the behaviour of the processing sharply diverse as a function of the value of the proof data input, the effect of which is to make the analysis work of the processing carried out by the attacker even more difficult.

Preferably, the pseudo-random function is a circular permutation. In this case the function can have the form:

$$f(\pi) = m^\pi \bmod 2^l$$

wherein: $\pi$ is the proof data, l is a predetermined whole number such that $2^{l-1}$ is first, and m is a predetermined generator of the cyclic group having $2^{l-1}$ elements.

Use of a function of circular permutation of this form is advantageous as it is particularly resistant to attacks consisting of comparing the output data obtained by executing the same processing on two different terminals having secret reference data of different value so as to deduce the mathematical formula of the function by cross-checking.

Preferably, the setting also comprises a truncation of the intermediate data. The truncation carried out leaves the possibility of having all possible values of a given interval for the relevant parameter.

Preferably, several parameters are simultaneously set during the setting step by different truncations of the intermediate data, and wherein the output data has a value as function of the value each parameter has been set to. These multiple truncations have two advantages. First, the fact of setting several parameters on which the output data depends is likely to further complicate the analysis work the attacker has to do to understand the image-processing carried out. Second, the truncations are executed on the basis of the same intermediate data, such that a single application of the hashing function is necessary to obtain values for the different parameters.

The sensor can also be a biometric sensor.

A computer program product is also proposed according to a second aspect of the invention, comprising program code instructions for execution of the steps of the method according to the first aspect of the invention, when this program is executed by at least one processor.

A terminal is also proposed according to a third aspect of the invention, comprising a sensor for acquiring an image, an input interface for receiving proof data input by a user, and an image-processing module configured to set at least one parameter to a first value when the proof data is equal to a secret reference data, and to a second value different to the first value when the proof data is different to the secret reference data, and generate output data from the image acquired and from the parameter, the output data having a value dependent on the value the parameter has been set to.

DESCRIPTION OF FIGURES

Other characteristics, aims and advantages of the invention will emerge from the following description which is purely illustrative and non-limiting and which must be considered with respect to the appended drawings, in which.

In all figures, similar elements bear identical reference numerals.

DETAILED DESCRIPTION OF THE INVENTION

Figure 1:
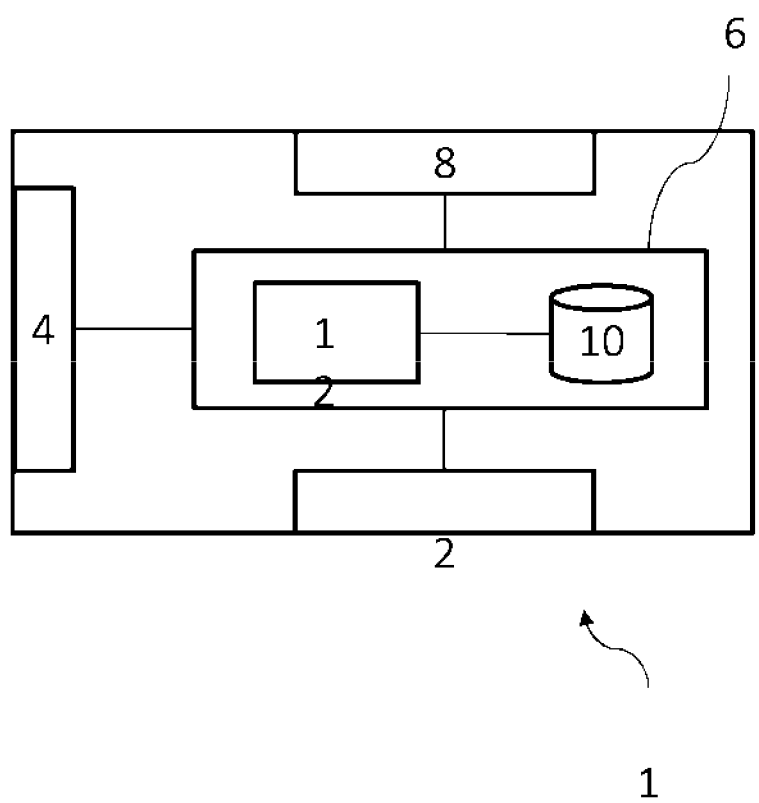
FIG. 1 schematically illustrates a system of biometric authentication according to an embodiment of the invention.

In reference to FIG. 1, a terminal 1 comprises an interface 2 of data input by a user of the terminal 1, an image sensor 4, an image-processing module 6 and a display screen 8.

The input interface 2 comprises typically at least one of the following elements: a keypad, a touch-sensitive element, a mouse.

The image sensor 4 is for example a biometric sensor. The focus hereinbelow will be an embodiment wherein the biometric sensor 4 is configured to acquire data representative of a fingerprint of a user of the terminal 1.

The image-processing module 6 is configured to apply a an image-process to data acquired by the image sensor 4 so as to produce output data.

The image-processing module 6 typically comprises a memory 10 and at least one processor 12 configured to execute a computer program stored in the memory 10.

The program also comprises first code instructions for executing the image-process itself, these first code instructions inputting a datum supplied by the sensor 4 and also n parameters $p_1, \ldots, p_n$ (n being greater than or equal to 1). When executed by the processor 12, these first code instructions produce an output datum dependent on these input data (datum supplied by the sensor 4 and the parameters $p_1, \ldots, p_n$).

It is assumed that a combination of optimal values $o_1, \ldots, o_n$ for the n parameters $p_1, \ldots, p_n$ was determined previously. Here, optimal values mean values which result in obtaining an output datum of maximal quality according to a predetermined metric, when the first code instructions are executed by the processor 12 of the image-processing module 6.

These optimal values $o_1, \ldots, o_n$ of parameters are not directly stored in the terminal 1.

The program also comprises second code instructions whereof the aim is to set respective values to the n parameters used by the first code instructions. These second code instructions especially call on a function $f$ of predetermined general formula inputting a proof datum.

The image of the proof datum by this function $f$ is a hashed datum h:

$$h = f(\pi)$$

Values for the parameters $p_1, \ldots, p_n$ can be deducted from the intermediate datum h by truncations which will be detailed below.

The cryptographic hashing function $f$ is configured so that it can be deduced from the intermediate datum h:
- the combination of n optimal values $o_1, \ldots, o_n$ for the parameters $p_1, \ldots, p_n$, a proof datum $\pi$ equal to a secret reference datum PIN specific to a user of the terminal 1 is provided as input of the function $f$.
- other combinations of n values for the parameters $p_1, \ldots, p_n$ when a proof datum having other values is provided as input of the function $f$.

Preferably, the function $f$ is a circular permutation.

Preferably, it is ensured that the codomain of the function is large enough so that each combination of n values produced by the function is specific to the value of the input proof datum.

In a first embodiment, $f$ is a linear function of the following form:

$$f(\pi) = l\pi + m$$

where l and m are predetermined constants stored in the terminal 1.

But it should be noted that using such a linear function an attacker could guess the optimal values $o_i$ of the parameters $p_i$ by setting up correlations between two terminals executing the same processing but belonging to different owners. An attack achieving this aim is in fact the following.

Assuming that the optimal values $o_i$ of the parameters $p_i$ are common values for two terminals, and that the respective secret data PIN of two terminals are different. As a consequence, the two functions $f$ performed in the two terminals can be represented by two straight lines constituted by points having the coordinates $(\pi, f(\pi))$. The point of intersection of these two straight lines is the point (PIN, $f$(PIN)) resulting in optimal values $o_i$. By conducting several input tests on the proof datum $\pi$ on the two terminals, the attacker can reconstruct these two straight lines, determine their point of intersection and accordingly be guided towards the set of optimal values $o_i$ of the parameters $p_i$.

In a second embodiment, the pseudo-random function has the following form:

$$f(\pi) = m^\pi \bmod 2^l$$

wherein:
- l is a predetermined whole number such that $2^{l-1}$ is first,
- m is a predetermined generator of the cyclic group having $2^{l-1}$ elements.

It is the setting of these constants l and m which ensures that the function $f$ respects the rule mentioned hereinabove, resulting in, for any i going from 1 to n, $p_i = o_i$ if and only if $\pi$=PIN).

mod is the modulo operator.

The function $f$ according to this second embodiment is particularly advantageous relative to a linear function as it is resistant to the above attack based on setting up correlations between several terminals.

The terminal 1 is for example a telephone, a smartphone, a desk computer, a portable computer, a tablet, etc.

Figure 2:
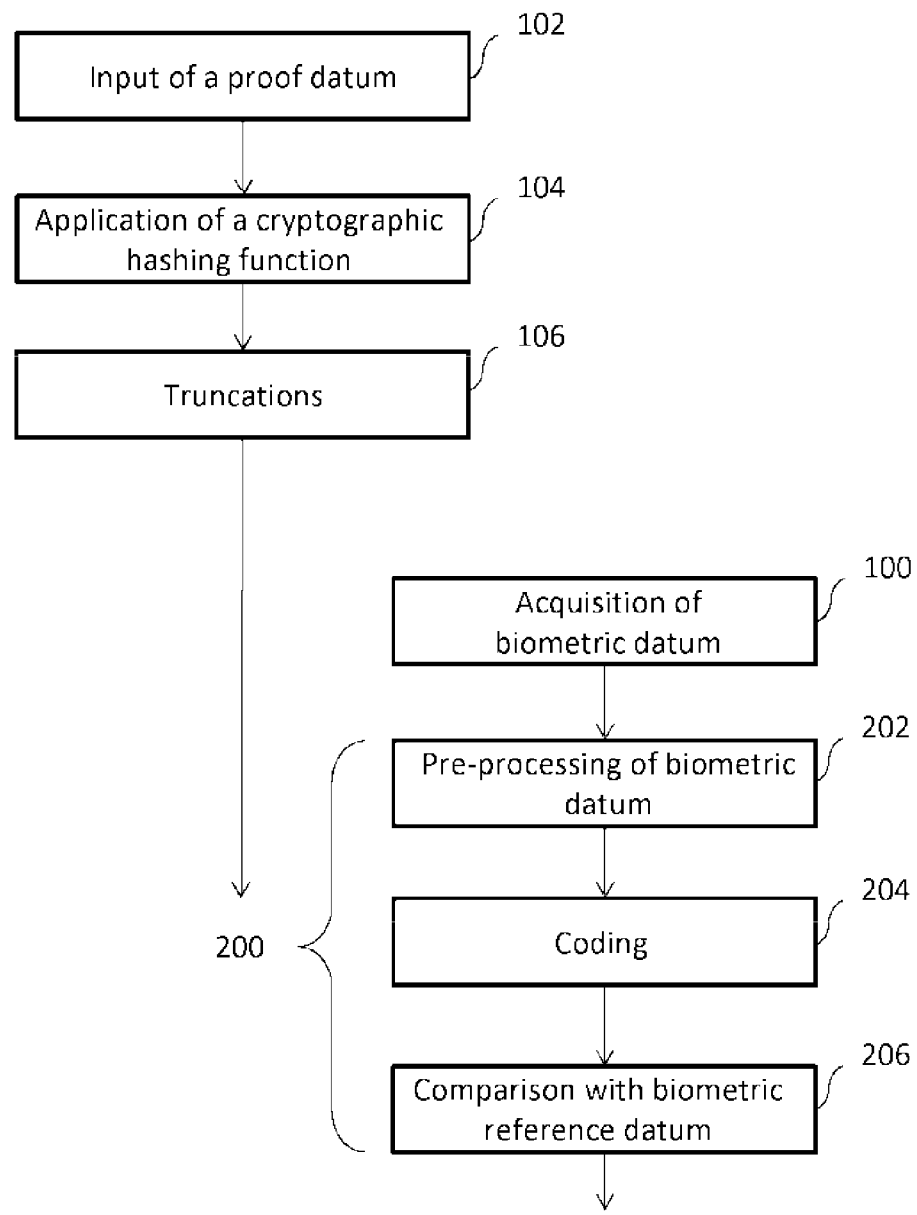
FIG. 2 is a flow chart of steps of a method of biometric authentication according to an embodiment of the invention.

In reference to the flow chart of FIG. 2, a method executed at the terminal 1 comprises the following steps.

The biometric sensor 4 acquires a biometric datum, for example representative of the fingerprint of a user of the terminal 1 (step 100).

The processor 12 also triggers display on the display screen 8 of the terminal 1 of a message inviting the user of the terminal 1 to input a proof datum $\pi$.

The input interface 2 acquires a proof datum $\pi$ input by the user of the terminal 1 (step 102) in reaction to this invitation message displayed on the display screen 8.

The display of the message and/or the acquisition 102 of the proof datum can be executed before or after acquisition of the biometric datum by the biometric sensor 4.

The processor 12 generates a combination of n values for the n parameters $p_i$. This generation comprises the following sub-steps.

The processor 12 applies the pseudo-random function $f$ to the proof datum $\pi$ by using the constants l and m previously stored in the memory 10 of the terminal 1 (step 104), so as to produce the intermediate datum h.

The intermediate datum h has a binary representation having a certain number of bits.

The intermediate datum forms the object of truncations so as to produce the n values of the parameters $p_i$ (step 106). This gives for example:

$$h = a | p_1 | \ldots | p_i | \ldots | p_n$$

where | is representative of the truncations performed. Here, bits of the lightest weights of the intermediate datum h are used to form the value of the parameter $p_n$, and at least one bit a of heaviest weight of the intermediate datum h is left unused.

Next, the image-processing module 6 runs image-process 200 by executing the first code instructions so as to generate an output datum from the biometric datum acquired by the biometric sensor 4 and from the values of parameters $p_i$ which were generated on the basis of the proof datum input by the user of the terminal 1.

The image-process 200 typically comprises a pre-processing step of the biometric datum acquired, then a coding step.

The pre-processing step can comprise at least one of the following processing events: setting of contrast, setting of brightness, application of gain, resampling (refreshment rate setting).

The image-process 200 can also comprise a step for liveness detection. This detection step, known per se, aims to ensure that the acquired image originates effectively from one person. For example, the detection step performed is that described in the document "Secure Face Unlock: Spoof Detection on Smartphones", 2016, by Keyurkumar Patel and Anil K. Jain.

During at least one of its sub-steps 202, 204 the processing 200 utilises the values generated for the parameters $p_i$.

In a first case, the proof datum input by the user is equal to the secret reference datum ($\pi$=PIN). Because of the particular way in which the function $f$ was previously constructed, in this case the processor 12 generates the optimal values $o_i$ for the parameters $p_i$. As a consequence, the output datum produced on completion of the processing 200 is of good quality.

In a second case, the proof datum input by the user is different to the secret reference datum ($\pi \neq$PIN). This second case can occur especially when a non-authorised user has appropriated the terminal 1 and is trying to pass himself off as the user of the terminal 1. The processor 12 generates values for the legitimate parameters $p_i$ which are degraded relative to the values $o_i$. As a consequence, the output datum produced on completion of the processing 200 is of degraded quality.

The output datum can be exploited in various ways.

In a first embodiment, the output datum is used during a later method of biometric authentication granting the access by the user of the terminal 1 to a certain service. The output datum is itself a biometric proof datum which is then compared (step 206) to a biometric secret reference datum registered during a previous enrolment phase of the legitimate user of the terminal 1. The comparison 206 of the two data biometric is known from the prior art. If the two compared biometric data are equal (or close enough), a positive authentication result is produced on completion of step 206. The user of the terminal 1 obtains access to the service. If the two compared biometric data are different (or too far), a negative authentication result is produced on completion of step 206. Access to the service is therefore not authorised by the terminal 1.

In a second embodiment, the above comparison 206 between the two biometric data forms part of the processing 200 itself executed at the terminal 1, and the output datum of this processing is in fact the result of biometric authentication. In this embodiment, the quality of the output datum can be measured for example in terms of probability of missed detection (that is, a probability that the legitimate user of the terminal 1 will obtain a positive authentication result). This probability must be the smallest possible. With intentional degrading of the parameters $p_i$ used during the processing during input of an incorrect proof datum (that is, different to the secret reference datum), this probability can be increased to a value close to 100% such that a non-authorised user cannot obtain a positive authentication result.

The invention claimed is:

1. A method for processing an image at a terminal, wherein the method comprises:
   receiving proof data previously input by a user of the terminal,
   setting a parameter to a first value when the proof data is equal to secret reference data, and to a second value different to the first value when the proof data is different to the secret reference data, wherein the setting comprises applying a pseudo-random function to the proof data so as to produce intermediate data, wherein the parameter depends on the intermediate data,
   generating output data from input data being or dependent on an image previously acquired by a sensor, and also from the parameter, wherein the output data has a value dependent on the value the parameter has been set to,
   wherein values of the parameter are adapted so that the output data is degraded when the parameter is set to the second value relative to when the parameter is set to the first value.

2. The method according to claim 1, wherein the second value of the parameter is specific to the proof data received.

3. The method according to claim 1, wherein the output data is a biometric proof data to be compared to biometric secret reference data.

4. The method according to claim 1, wherein the pseudo-random function is a circular permutation.

5. The method according to claim 1, wherein the function has the form:

$$f(\pi) = m^{\pi} \bmod 2^l$$

wherein:
   $\pi$ is the proof data,
   $l$ is a predetermined whole number such that $2^{l-1}$ is prime,
   $m$ is a predetermined generator of a cyclic group having $2^{l-1}$ elements.

6. The method according to claim 1, wherein the setting also comprises truncating the intermediate data.

7. The method according to claim 6, wherein several parameters are simultaneously set during the setting step by different truncations of the intermediate data, and wherein the output data has a value dependent on the value of each parameter has been set to.

8. The method according to claim 1, wherein the sensor is a biometric sensor.

9. A non-transitory computer program product comprising program code instructions for processing an image, wherein the instructions are for execution of the steps of:
   receiving proof data previously input by a user of the terminal,
   setting a parameter to a first value when the proof data is equal to secret reference data, and to a second value different to the first value when the proof data is different to the secret reference data, wherein the setting comprises applying a pseudo-random function to the proof data so as to produce intermediate data, wherein the parameter depends on the intermediate data, generating output data from input data being or dependent on an image previously acquired by a sensor, and also from the parameter, wherein the output data has a value dependent on the value the parameter has been set to, when said program code instructions are executed by at least one processor,
   wherein values of the parameter are adapted so that the output data is degraded when the parameter is set to the second value relative to when the parameter is set to the first value.

10. A terminal for processing an image, comprising a sensor for acquiring an image, an input interface for receiving proof data input by a user, and an image-processing module configured to:
   set a parameter to a first value when the received proof data is equal to secret reference data, and to a second value different to the first value when the proof data is different to the secret reference data, wherein the setting comprises applying a pseudo-random function to the proof data so as to produce intermediate data, wherein the parameter depends on the intermediate data,
   generate output data from the image acquired and from the parameter, the output data having a value dependent on the value the parameter that has been set to,
   wherein values of the parameter are adapted so that the output data is degraded when the parameter is set to the second value relative to when the parameter is set to the first value.

* * * * *